(12) United States Patent
Smith et al.

(10) Patent No.: US 7,351,468 B2
(45) Date of Patent: Apr. 1, 2008

(54) INTERLAYERS FOR LAMINATED SAFETY GLASS WITH SUPERIOR DE-AIRING AND LAMINATING PROPERTIES AND PROCESS FOR MAKING THE SAME

(75) Inventors: Charles Anthony Smith, Vienna, WV (US); Jerrel Charles Anderson, Vienna, WV (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 11/292,721

(22) Filed: Dec. 2, 2005

(65) Prior Publication Data

US 2006/0141212 A1    Jun. 29, 2006

(51) Int. Cl.
B32B 3/00 (2006.01)
B32B 17/10 (2006.01)

(52) U.S. Cl. .................. 428/141; 428/156; 428/172; 428/183; 428/441; 428/442

(58) Field of Classification Search ................ 428/141, 428/156, 172, 183, 436, 437, 441, 442
See application file for complete search history.

(56) References Cited

U.S. PATENT DOCUMENTS

| | | |
|---|---|---|
| 2,904,844 A | 9/1959 | Smithies |
| 3,264,272 A | 8/1966 | Rees |
| 3,344,014 A | 9/1967 | Rees |
| 3,404,134 A | 10/1968 | Rees |
| 3,437,718 A | 4/1969 | Rees |
| 3,471,460 A | 10/1969 | Rees |
| 4,035,549 A | 7/1977 | Kennar |
| 4,323,247 A | 4/1982 | Keches et al. |

(Continued)

FOREIGN PATENT DOCUMENTS

EP    0476330 B1    3/1992

(Continued)

OTHER PUBLICATIONS

Webster's New World Dictionary of American English, Third College Edition, Copyright © 1988 by Simon & Schuster, Inc., p. 835.

(Continued)

*Primary Examiner*—D. S Nakarani
(74) *Attorney, Agent, or Firm*—Kevin S. Dobson; Mark D. Kuller

(57) ABSTRACT

This invention relates to thermoplastic interlayers for laminated safety glass with superior vacuum de-airing at elevated temperatures and superior tacking and edge sealing properties. The sheeting has surface pattern on at least one of the surfaces characterized by flat surfaces with substantially uninterrupted channels for airflow in at least two non-parallel directions. The channels allow for rapid de-airing while the area roughness parameter ratio $AR_p/AR_t$ in the range of 0.52 to 0.62, ARt being less than 32 μm, and area kurtosis less than 2.5, allow for ease of tacking of the interlayer onto glass and edge sealing after de-airing has been completed. Said surface pattern may also be superimposed onto a pattern which is generated by melt fracture or other means on at least one side to enhance de-airing and aid edge sealing.

25 Claims, 8 Drawing Sheets

U.S. PATENT DOCUMENTS

| | | | |
|---|---|---|---|
| 4,452,840 A | 6/1984 | Sato et al. | |
| 4,452,935 A | 6/1984 | Nomura et al. | |
| 4,619,973 A | 10/1986 | Smith | |
| 4,663,228 A | 5/1987 | Bolton et al. | |
| 4,668,574 A | 5/1987 | Bolton et al. | |
| 4,799,346 A | 1/1989 | Bolton et al. | |
| 4,906,703 A | 3/1990 | Bolton et al. | |
| 5,002,820 A * | 3/1991 | Bolton et al. | 428/215 |
| 5,061,748 A | 10/1991 | Bolton et al. | |
| 5,091,258 A | 2/1992 | Moran | |
| 5,124,208 A | 6/1992 | Bolton et al. | |
| 5,344,513 A | 9/1994 | Takemaka | |
| 5,455,103 A | 10/1995 | Hoagland et al. | |
| 5,496,640 A | 3/1996 | Botlon et al. | |
| 5,532,066 A | 7/1996 | Latiolais et al. | |
| 5,536,347 A | 7/1996 | Moran | |
| 5,626,809 A | 5/1997 | Mortelmans | |
| 5,763,062 A | 6/1998 | Smith et al. | |
| 5,895,721 A | 4/1999 | Naoumenko et al. | |
| 6,093,471 A | 7/2000 | Hopfe et al. | |
| 6,159,608 A | 12/2000 | Friedman et al. | |
| 6,479,155 B1 | 11/2002 | Gelderie et al. | |
| 6,660,556 B2 | 12/2003 | Hashimoto et al. | |
| 6,800,355 B2 * | 10/2004 | Wong | 428/141 |
| 6,863,956 B1 | 3/2005 | Nakajima et al. | |
| 2002/0155302 A1 | 10/2002 | Smith et al. | |
| 2003/0012964 A1 | 1/2003 | Choi et al. | |
| 2003/0022015 A1 | 1/2003 | Wong | |
| 2003/0044579 A1 | 3/2003 | Bolton et al. | |
| 2003/0098060 A1 | 5/2003 | Yoshimi | |
| 2003/0124296 A1 | 7/2003 | Smith | |

FOREIGN PATENT DOCUMENTS

| | | |
|---|---|---|
| EP | 0 483 087 A1 | 4/1992 |
| EP | 0785064 A1 | 7/1997 |
| GB | 828381 | 2/1960 |
| WO | WO 96/41717 | 12/1996 |
| WO | WO 99/58334 | 11/1999 |

OTHER PUBLICATIONS

Abstract for JP 08295541, Nov. 12, 1996, DuPont Mitsui Polychem Co. Ltd.

PCT International Search Report for International application No. PCT/US99/10354 dated Sep. 3, 1999.

PCT International Preliminary Examination Report for International application No. PCT/US99/10354 dated Sep. 20, 2000.

PCT International Search Report and Written Opinion for International Application No. PCT/US2006/046056 dated Apr. 10, 2007.

European Search report and European search opinion for European Patent Application 06 021 206.5-2124 dated Feb. 1, 2007.

'Surlyn® [SPEC0416] 1707 packaging resin', Internet brochure by DuPont Packaging [SPEC0417] 1995-2003.

\* cited by examiner

INTERLAYERS FOR LAMINATED SAFETY GLASS WITH SUPERIOR DE-AIRING AND LAMINATING PROPERTIES AND PROCESS FOR MAKING THE SAME

BACKGROUND OF THE INVENTION

In the fabrication of laminated safety glass, it is customary to place a piece of thermoplastic sheeting between two pieces of float glass. It is also common that the thermoplastic interlayer's surface can be roughened to avoid blocking, i.e., one layer of interlayer sticking to another. The roughness on the interlayer can also allow the interlayer to be moved while the two pieces of glass are aligned as the glass/interlayer/glass sandwich (hereinafter, "assembly") is constructed. In constructing such an assembly, air is trapped in the interstitial space between the glass surface and the bulk of the thermoplastic interlayer. Trapped air can be removed either by vacuum de-airing or by nipping the assembly between a pair of rollers.

The degree to which air must be removed (reduced) from between the glass and interlayer will depend on the nature of the interlayer to absorb the air (dissolution) during the further laminating steps (often an autoclave is used) such that the air forms a 'solution' with the interlayer. The presence of a gaseous phase within the laminate will take the form of bubbles or pockets of gas between the interlayer and glass interface. These are generally objectionable for end use applications where the laminate functions as a transparent article, that is, being essentially free of optical defects (e.g. relatively low-haze thus providing a transparent article without hindering visibility). Autoclaving is a step typically utilized in the production of laminated glass using a combination of heat and pressure to hasten the dissolution of any residual air (gaseous component) within the laminate assembly. As external pressure on the laminate is increased (by thermodynamic principals), it restricts the ability for gaseous components to either remain or to form. After laminate processing, the desire is for creation of a 'solid-phase' of interlayer, essentially free of a gas phase, is paramount. Additionally, the laminate should remain 'bubble-free' for a substantial period of time (years) under end use conditions to fulfill its commercial role. It is not an uncommon defect in laminated glass for dissolved gasses to come out of solution (form bubbles or delaminated areas between the glass/interlayer interface) as time progresses, especially at elevated temperatures experienced in automobiles, buildings and the like, often due to weather conditions and sunlight exposure.

In the case of vacuum de-airing, air is removed while the assembly is at ambient temperature. Tacking of the interlayer to the glass and sealing of the edges is accomplished by heating the entire assembly while it is still under vacuum. The assembly, after the heating step, is generally referred to as a pre-press or a pre-laminate.

In the case of nipping, the assembly is generally heated to a temperature between 50-100° C., and is then passed through one or more sets of nip rolls. Edge sealing is accomplished by the force of the rollers exerted on the two pieces of glass. At the end of the nipping step, the assembly is called a pre-press. In windshield manufacture, the nip rolls are often articulated so as to accommodate the curvature in the windshield. When complex shapes and angles are involved, or when several models of windshields are made concurrently, it is often more convenient to use the vacuum de-airing method.

However, laminators may encounter an issue when selecting a suitable interlayer. It is sometimes difficult to choose an interlayer with optimal features for pre-pressing, namely, rapid air removal and proper edge seal. Interlayers which have rougher surfaces as measured by the 10-point roughness (ISO R468), Rz, can allow for faster de-airing. However, such interlayers can make it inconvenient to obtain edge seal as more energy is generally required to compact the rough interlayer. If the edges of the pre-press are not completely sealed, air can penetrate the edge in the autoclaving step where the pre-press is heated under high pressure, and can cause visual defects in the laminate which is commercially unacceptable. Laminators who use vacuum for de-airing in hot environments can have added difficulty. Interlayers that are rough and allow for rapid de-airing at about room temperature (23° C.) often do not de-air as well when the ambient temperature is much above 30° C.

On the other hand, relatively smooth interlayers can lead to the edges sealing before sufficient air is removed, and can leave air trapped inside the pre-press. This problem is commonly referred to as pre-mature edge seal, and can be especially common with PVB interlayers. During autoclaving, the excess air may be forced into solution under high pressure, but may return to the gas phase after autoclaving. Defects which occur after lamination are often more costly to rectify.

Safety glasses can be obtained using various types of interlayer materials, including, for example: polyvinyl butyral (PVB); polyurethane (PU); ethylene copolymers such as ethylene vinyl acetate (EVA) and/or ethylene/acid copolymers (acid copolymers) and/or ionomeric derivatives thereof (ionomers); and polyvinyl chloride (PVC). Polymeric interlayer materials are thermoplastic. Thermoplastic interlayers are typically heated during the lamination process to soften the interlayer and facilitate adhesion to glass or plastic material. Surface patterns on the interlayers can be provided to allow for rapid de-airing even at high temperatures, and also allow good edge seal to be obtained. Choice or design of an ideal surface pattern can depend on the lamination process parameters as well as on the interlayer material. For example, PVB that is plasticized for use in safety glass is a tacky material that readily adheres to glass even at room temperature. Various surface patterns can be used with PVB, but typically the patterns are designed to account for the physical characteristics of the specific interlayer and/or the specific process.

Ionomer or ionoplastic material (the terms are used interchangeably in the present application, and are considered identical for the purposes of the present invention) is typically not plasticized, and the physical properties of interlayer sheeting obtained from ionomer can be substantially different from the physical properties of other interlayer materials such as PVB. Due to these physical differences, surface patterns useful for plasticized PVB interlayer sheeting may not be ideal for ionomer interlayer sheeting, and vice versa.

The surface patterns for plasticized PVB, for example, tend to be deep to allow air to escape during the lamination process. The broad melting or softening range of plasticized PVB allows the use of such deep patterns. However, the use of deep patterns with ionoplastic interlayers is not trouble-free. The deeper patterns tend to allow more dust or dirt to settle on the surface of the interlayer and can give rise to "pattern haze" in the laminate. Also, the sharper melting range of an unplasticized interlayer can lead to trapped air in the laminate.

SUMMARY OF THE INVENTION

Figure 1A:
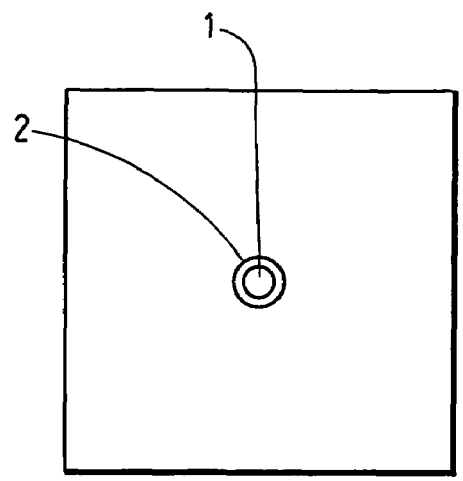
FIG. 1(a) is a top-side view of a pre-laminate assembly.

In one aspect the present invention is an unplasticized thermoplastic sheet useful for making safety glass laminates, wherein the sheet comprises at least one surface embossed with a regular pattern which provides relatively uninterrupted channels for de-airing in two directions, said channels having depth of less than about 20 microns, and width 30 microns to 300 microns and spaced between 0.1 mm and 1 mm apart.

In another aspect, the present invention is a glass/adhesive sheet laminate comprising at least one layer of glass and a sheet of unplasticized thermoplastic interlayer, said interlayer having at least one surface embossed with a regular pattern which provides relatively uninterrupted channels for de-airing in two directions, said channels having depth of less than about 20 micrometers (microns), and width 30 microns to 300 microns and spaced between 0.1 mm and 1 mm apart.

In still another aspect, the present invention is a process of manufacturing a laminated safety glass article comprising the steps of: (1) embossing at least one surface of an unplasticized thermoplastic interlayer with a regular pattern which provides relatively uninterrupted channels for de-airing in two directions, said channels having depth of less than about 20 microns, and width 30 microns to 300 microns and spaced between 0.1 mm and 1 mm apart; (2) laminating the embossed sheet to at least one glass surface, wherein the embossed surface of the unplasticized thermoplastic interlayer is laminated to glass.

DETAILED DESCRIPTION OF THE INVENTION

In one embodiment, the present invention is an interlayer suitable for use in laminar structures comprising at least one ply of glass. An interlayer of the present invention is a thermoplastic interlayer that can be heated and be caused to form an adhesive bond with other interlayer materials, with rigid plastic materials, and/or with glass.

Laminates comprising interlayers of the present invention are are suitable for use as safety glazing in a variety of applications. For example, laminates of the present invention can be suitable for use in automobiles, airplanes, trains, or other modes of transportation comprising windows or transparent apertures wherein safety glazing can be used to protect the occupants or contents of the vehicle. Other suitable applications for safety glazing are well known, including for example, windows in homes and other buildings, building facades, cabinets, weight bearing architectural structures such as stairs and floors for example.

The appearance and transparency of transparent laminates such as those described in the present invention, or of conventional laminates, is an important feature in assessing the desirability of using said laminates. One factor affecting the appearance of said laminates is whether the laminate includes trapped air or air bubbles that develop between the interlayer and the surface of the glass, for example. It is desirable to remove air in an efficient manner during the lamination process. Providing channels for the escape of air and removing air during lamination is a known method for obtaining laminates having acceptable appearance.

This can be effected by mechanically embossing or by melt fracture during extrusion the interlayer sheet followed by quenching so that the roughness is retained during handling. Retention of the surface roughness is essential in the practice of the present invention to facilitate effective deaeration of the entrapped air during laminate preparation.

Surface roughness, Rz, can be expressed in microns by a 10-point average roughness in accordance with ISO-R468 of the International Organization for Standardization and ASMEB46.1 of the American Society of Mechanical Engineers. For sheeting having a thickness greater than about 0.76 mm, 10-point average roughness, Rz, of up to 80 µm is sufficient to prevent air entrapment. The width of the channels is from about 30 µm to about 300 µm, preferably from about 40 to about 250 µm, and more preferably from about 50 to about 200 µm. The surface channels are spaced between from about 0.1 mm to about 1 mm apart, preferably from about 0.1 to about 0.9 mm apart, more preferably from about 0.15 to about 0.85 mm apart.

Surface roughness, Rz, measurements from single-trace profilometer measurements can be adequate in characterizing the average peak height of a surface with roughness peaks and valleys that are nearly randomly distributed. However a single trace profilometer may not be sufficient in characterizing the texture of a surface that has certain regularities, particularly straight lines. In characterizing such surfaces, if care is taken such that the stylus does not ride in a groove or on a plateau, the Rz thus obtained can still be a valid indication of the surface roughness. Other surface parameters, such as the mean spacing (R Sm) may not be accurate because they depend on the actual path traversed. Parameters like R Sm can change depending on the angle the traversed path makes with the grooves. Surfaces with regularities like straight-line grooves are better characterized by three-dimensional or area roughness parameters such as the area peak height, $AR_p$, and the total area roughness, $AR_t$, and the area kurtosis (AKu) as defined in ASME B46.1. $AR_p$ is the distance between the highest point in the roughness profile over an area to the plane if all the material constituting the roughness is melted down. $AR_t$ is the difference in elevation between the highest peak and the lowest valley in the roughness profile over the area measured. In the instant invention, the surface pattern of the interlayer is characterized by $AR_t$ less than 32 µm, and the ratio of ARp to $AR_t$, also defined in ASME B46.1-1, is between 0.42 and 0.62, preferably 0.52 to 0.62. Said interlayer also has area kurtosis of less than about 5.

The present invention can be suitably practiced with any non-plasticized thermoplastic interlayer material. For example, polyurethane interlayers, ethylene vinyl acetate interlayers, ethylene acid copolymer interlayers, polyvinyl chloride interlayers can be suitable for use herein. In a particularly preferred embodiment, the present invention is obtained from an ionoplastic material such as is used by E. I. DuPont de Nemours and Company (DuPont) to produce the commercially available SentryGlas® Plus product used in glass laminates. The surface pattern is preferably an embossed pattern. The channel depth is from about 2 to about 80 micrometers. Preferably the channel depth is in the range of from about 2 to about 25 micrometers, more preferably in the range of from about 12 to about 20 micrometers, and most preferably in the range of from about 14 to about 20 micrometers. The depth is preferably selected so that the regular channels provide suitable paths for air to escape during the lamination process. It is desirable therefore that the depth be sufficiently deep that the air pathways are not cut off prematurely during the heating stage of the lamination process, leading to trapped air in the laminate when it cools. Also, particularly when using ionoplastic interlayers, it can be desirable to provide relatively shallow channels in comparison to, for example, PVB interlayer surface patterns. Larger channels provide larger reservoirs for air, and hence more air that requires removal during lamination.

An interlayer sheet can be embossed on one or both sides. The embossing pattern and/or the depth thereof can be asymmetric with respect to the two sides of an interlayer sheet. That is, the embossed patterns can be the same or different, as can be the depth of the pattern on either side of the sheet. In a preferred embodiment, an interlayer sheet of the present invention has an embossed pattern of each side wherein the depth of the pattern on each side is in the range of from about 12 to about 20 micrometers. In a particularly preferred embodiment, there is an embossed pattern on one side of the interlayer sheet that is orthogonal to the edges of the sheet, while the identical embossed pattern is slanted at some angle that is greater than or less than 90° to the edges, and the depth of said embossed patterns is in the range of from about 12 to about 20 micrometers. Offsetting the patterns in this manner can eliminate an undesirable optical effect in the sheeting.

Figure 2:
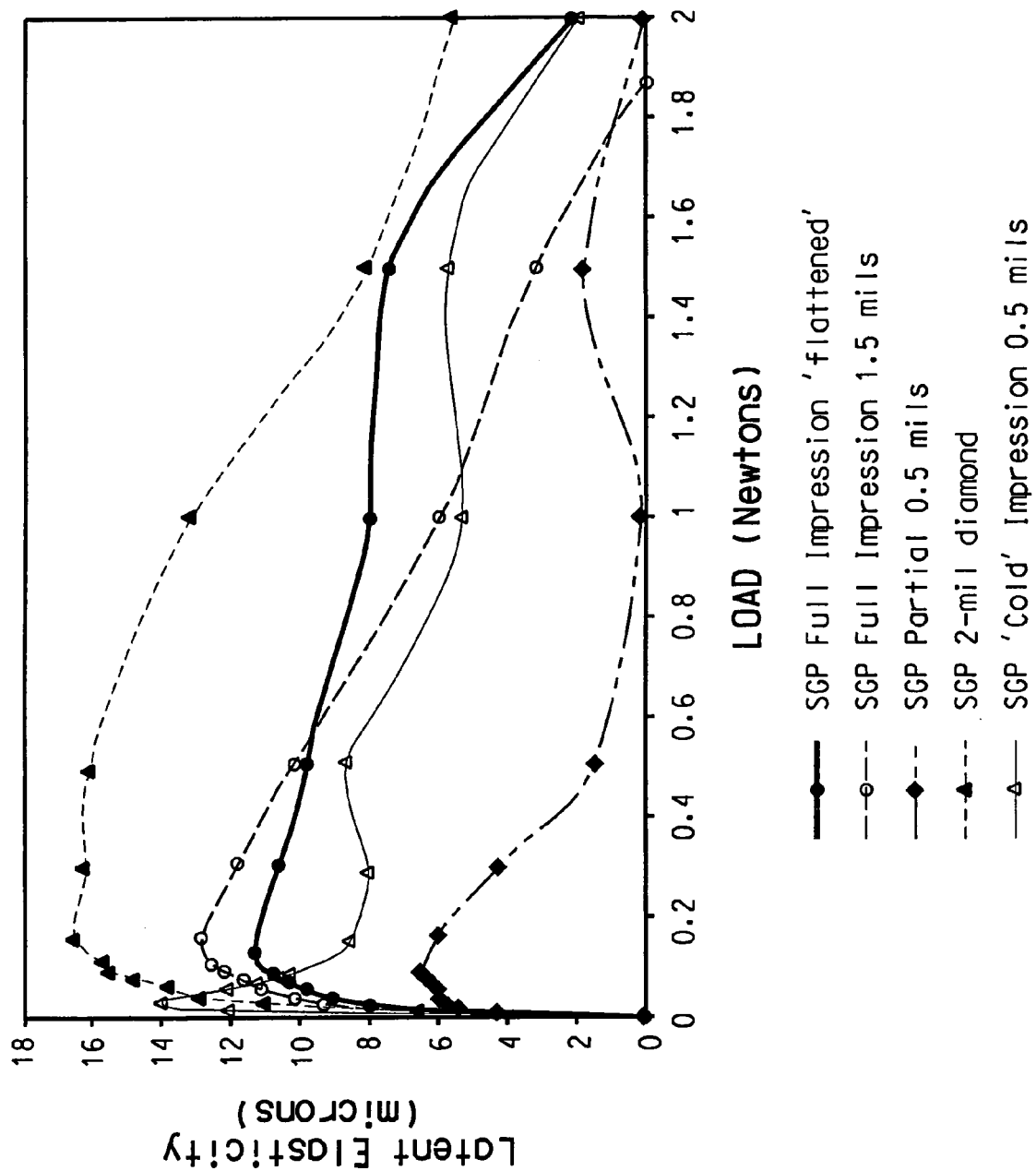
FIG. 2 is a graphical depiction of the thermomechanical analysis of the surface roughness of various ionoplastic surfaces.

In another embodiment, a surface pattern can be applied using a tool that imparts a pattern wherein the pattern requires less energy to obtain a flattened surface than conventional patterns. In the process of the present invention it is necessary to flatten the surface of the interlayer during the lamination, in order that the interlayer surface be in complete contact with the opposing surface to which it is being laminated when the lamination process is complete. The energy required to obtain a smooth or flattened surface can vary depending upon the surface topography, as well as the type of material being flattened. FIG. 2 graphically depicts the energy required to compress a series of polymer materials, wherein the only difference between the samples is the surface topography of each.

Conventional surface patterns or textures require a large percentage of the volume of the material that is raised above the imaginary plane of the flattened interlayer sheet to flow to areas that lie below the imaginary plane. Interlayer material that is above (primarily) and below the plane (which is the interface of the interlayer and glass after the lamination step is complete) must flow through a combination of heat, applied pressure, and time. Each particular pattern of different peak heights, spacing, volume, and other descriptors necessary to define the surface geometry will yield a corresponding amount of work or energy to compress the surface pattern. The goal is to prevent premature contact or sealing to occur prior to sufficient air removal being accomplished whether air removal is to be achieved by conventional techniques such as roll prepressing or vacuum bags/rings and the like.

In this embodiment a sheet having a surface roughness that allows for high-efficiency deairing but with less energy for compression (or at a controlled and desired level tailored for the prepress/deairing process) is obtained. One example of a surface pattern of the present invention comprises projections upward from the base surface as well as voids, or depressions, in the interlayer surface. Such projections and depressions would be of similar or the same volume, and located in close proximity to other such projections and voids on the interlayer surface. The projections and depressions are preferentially located such that heating and compressing the interlayer surface results in more localized flow of the thermoplastic material from an area of higher thermoplastic mass (that is, a projection) to a void area (that is, depression), wherein such voids would be filled with the mass from a local projection, resulting in the interlayer surface being flattened. Localized flow of the thermoplastic resin material to obtain a flattened surface would require less of an energy investment than a more conventional pattern, which require flattening of a surface by effecting mass flow of thermoplastic material across the entire surface of the interlayer. The main feature is the ability for the pattern to be flattened with relative ease as compared with the conventional art.

Several different criteria are important in the design of an appropriate surface pattern or texture for sheeting handling, ease of positioning, blocking tendency, ease of cleaning, deairing and possessing a robust process window for laminate manufacture.

A pre-press, as described hereinabove, can be measured for haze, and the haze values averaged. A pre-press having average haze of less than about 70% is preferable. A pre-press having average haze of less than about 50% is more preferred. A pre-press having average haze of less than about 20% is most preferred.

EXAMPLES

The following Examples and Comparative Examples are intended to be illustrative of the present invention, and are not intended in any way to limit the scope of the present invention.

Example 1

Surface Roughness Characterization

Surface roughness, Rz, can be expressed in microns by a 10-point average roughness in accordance with ISO-R468 of the International Organization for Standardization. Roughness measurements are made using a stylus-type profilometer (Surfcom 1500A manufactured by Tokyo Seimitsu Kabushiki Kaisha of Tokyo, Japan) as described in ASME B46.1-1995 using a trace length of 26 mm. $AR_p$ and $AR_t$, and the area kurtosis are measured by tracing the roughness over a 5.6 mm×5.6 mm area in 201 steps using the Perthometer Concept system manufactured by Mahr GmbH, Gottingen, Germany.

De-Airing Efficiency at Room Temperature

Figure 1B:
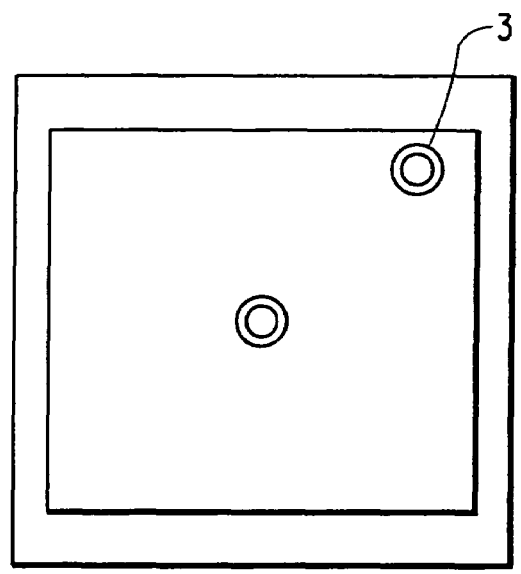
FIG. 1(b) is a top-side perspective of an assembly in a vacuum bag.
Figure 1C:
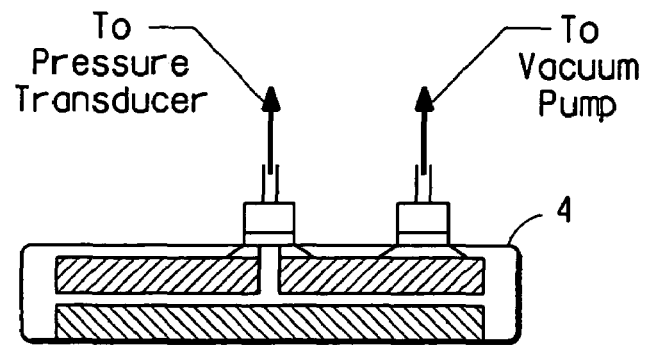
FIG. 1(c) is a cross-sectional view of along a diagonal.

De-airing efficiency of an interlayer with a specified pattern is determined using an apparatus which allows the absolute pressure of the interstitial space in an assembly to be measured (FIG. 1). The interlayer to be tested is assembled as a normal assembly, except that the top plate of glass has a hole (1) drilled through its center. The glass, the interlayer, and all auxiliary equipment must be equilibrated to 22.5±2.5° C. for one hour before testing. If an interlayer has two distinctly different patterns on either side, the side with the surface pattern to be evaluated is placed in contact with the piece of glass with a hole. The base of a pressure (or vacuum) coupler (2) is affixed and sealed around the hole in the glass (a vacuum coupler is a device which, when connected, enables air to move between an enclosure and the outside). A piece of fabric (about 30 mm wide) is wrapped around the edges of the assembly. The base of another vacuum coupler (3) plate is placed on top of two layers of cotton fabric (50 mm×50 mm) in one of the corners. The assembly with the peripheral breather and two base plates of couplers are then placed inside a 0.1-mm thick nylon bag (4). The bag is sealed. Cross-marks are cut through the bag just above the base plates. Vacuum couplers are attached through the nylon bag and care is taken to ensure that there are no leaks. The corner plate is attached to the vacuum source (nominally 84 kPa below atmospheric), while the center plate is attached to a vacuum gauge or a calibrated pressure transducer. The gauge reading (or transducer output) is recorded at given intervals after the vacuum is applied. The recorded data contain the absolute interstitial pressure at 10-second intervals for the first minute after vacuum is applied, at 15-second intervals thereafter for one-half minute, at 30-second intervals thereafter for another one-half minute, and at one-minute intervals thereafter up to 10 minutes after the application of vacuum. A surface that allows for efficient vacuum de-airing would cause the absolute interstitial pressure to drop rapidly within a few minutes. The interstitial pressure at 90 seconds after evacuation is indicative of how well the interlayer de-airs. If at 90 seconds after evacuation, the absolute interstitial pressure is above 53.3 kPa, de-airing is inadequate, and the interlayer is not suitable for vacuum de-airing.

De-Airing Efficiency at Elevated Ambient Temperature

Determination of de-airing efficiency at high (elevated) ambient temperature is the same as that at room temperature, except that the interlayer to be tested, the glass, couplers are all equilibrated to 30.5±2.5° C. prior to testing. If at 90 seconds after evacuation, the absolute interstitial pressure is above 53.5 kPa, de-airing is inadequate, and the interlayer is not suitable for vacuum de-airing when the ambient temperature is elevated, as in the summer.

Pre-Press Haze Measurement

A pre-press is made from each interlayer tested. The TAAT glass orientation is used. An interlayer is placed between two pieces of glass, the excess interlayer is trimmed. The glass/interlayer/glass sandwich, referred to as an assembly, is placed in a 0.1-mm (nylon) plastic bag. A vacuum adapter allows a vacuum hose to be connected to the inside of the plastic bag after it is sealed. The bag with the assembly inside is evacuated for 90 seconds at 53.3 kPa vacuum (48.0 kPa absolute pressure) at ambient temperature (22.5° C.±2.5° C.). After the initial vacuum, the nylon bag and its contents and the vacuum hose is placed inside an oven kept at 120-122° C. for 6 minutes. At the end of that time, the nylon bag is removed from the oven and the vacuum hose is disconnected immediately. The glass/interlayer/glass structure at this stage is called a pre-press. Depending on the starting interlayer roughness, the pre-press may appear hazy or clear. Haze is measured by using a Hazegard hazemeter from Gardner in eight places in the pre-press. The results can be averaged.

An ionoplastic interlayer was placed between two rubber plates. The rubber surfaces in contact with the ionoplastic interlayer were engraved with a pattern with ridges that form a grid pattern. The ridges were approximately 12 µm in width and 45 µm in height, and were spaced such that there were approximately 9 grids per square mm. The rubber/interlayer/rubber sandwich assembly was placed between two pieces of nominally 3.2-mm thick annealed glass. The 5-ply sandwich was put inside of a woven nylon bag, and the nylon bag and its contents were placed inside of a rubber vacuum bag. The rubber vacuum bag was fitted with a piece of tubing which was sealed through the edge of the bag, and which enabled connection to a vacuum source. The open end of the vacuum bag was closed. Vacuum (at least 80 kPa below atmospheric) at ambient temperature (22.5±2.5° C.) was applied for 5 minutes. Immediately thereafter, the vacuum bag with its contents was placed in an oven at 120° C. for 40 minutes. After that time, the vacuum bag was removed from the oven. Vacuum was disconnected, and the vacuum bag and its contents were allowed to cool to room temperature. One of the engraved rubber plates was gently removed to expose the now embossed interlayer sheet. The interlayer was then gently peeled off from the second embossed rubber plate. The embossed pattern on the interlayer was grid-like with channels in one instance, were for example approximately 12 µm wide and 41 µm deep, and with approximately 9 grids per square mm.

Example 2

Various ionomer sheets having an methacrylic acid content of approximately 19% and a degree of neutralization of 37% with sodium ion were obtained in a size of 600-mm square at a thickness of about 2.3-mm were placed between two sheets of abrasion-resistant coated polycarbonate (Lexan® MR 3/16" thickness). This sandwich was then vacuum-bagged using standard techniques and a vacuum was drawn on the assembly for 30 minutes at about 30 torr absolute pressure. After this deairing step, the vacuum-bagged assembly was then heated in a convection air oven to 120 C. for 45 minutes after which it was cooled back down to room temperature while under vacuum. This procedure was utilized to produce ionomer sheeting possessing low haze and smooth, essentially parallel surfaces. These materials were used as precursors for then embossing with textured rubber sheets as described previously, metal mesh and other materials were used to create a variety of roughened/textured surfaces to further study.

In other cases, ionomer sheeting was produced by use of an extrusion line consisting of a twin-screw extruder, a sheet die feeding melt into a calendar roll stack was utilized to manufacture essentially large flat ionomer sheet having a substantially uniform thickness. The calendar rolls have an embossed surface pattern engraved into the metal surface which imparts to varying degrees a reverse image of the surface texture onto the polymer melt as it passes between and around the textured rolls. Other ionomer sheeting of the same composition was produced that had an embossed diamond pattern with an impression depth of about 2 mils (Rz 61.8 um). The diamonds were 'raised' areas on the sheet surface leaving relatively continuous channels to allow for air to flow when either vacuum was applied to the assembly or if outward force was applied (e.g. roll prepress nips) to progressively force a portion of the air out of the laminate assembly.

Another ionomer sheeting composition was produced that had an embossed random pattern of finer detail than the diamond pattern. An Rz of 14.9 urn was the measured surface roughness of that sheeting (random pattern).

Example 3

A DuPont Thermomechanical Analyzer was used to make delicate measurements of the degree of compression as a function of the applied force and parameters of time and temperature. Some of the 'bulk' flow properties are displayed in Table 1 where the displacement of the TMA probe was indexed at 20 and 60% of the respective thickness of the interlayer under study (PVB and Ionomer). At each force level, the temperature was ramped at 5 C./minute from –20 C. to 200 C. and the temperature was recorded when each of the compression indices was obtained.

TABLE 1

| Weight on Probe (gms.) | Pressure (psi) | Temperature (C.) for Probe to Reach 20% and 60% Compression of Interlayer Thickness | | | |
|---|---|---|---|---|---|
| | | TEMP. @ –60% | | TEMP. @ –20% | |
| | | PVB | Ionomer | PVB | Ionomer |
| 3 | 0.9 | 151 | 142 | 134 | 114 |
| 15 | 4.4 | 131 | 114 | 108 | 97 |
| 50 | 14.5 | 113 | 103 | 89 | 91 |
| 681 | 198.1 | 58 | 85 | 64 | 80 |

Figure 3:
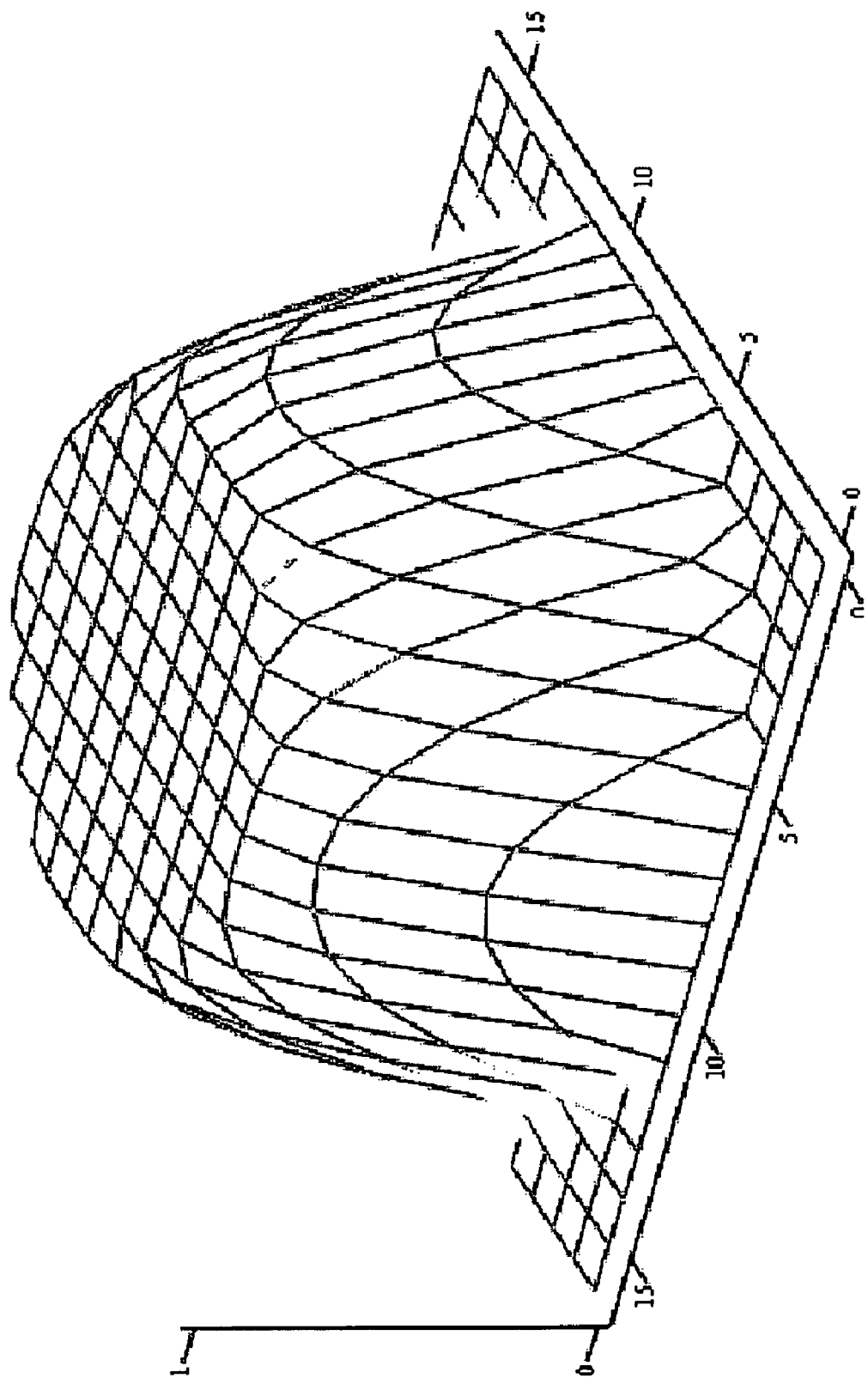
FIG. 3 is a graphical depiction of surface roughness as a raised volume of polymer.
Figure 4:
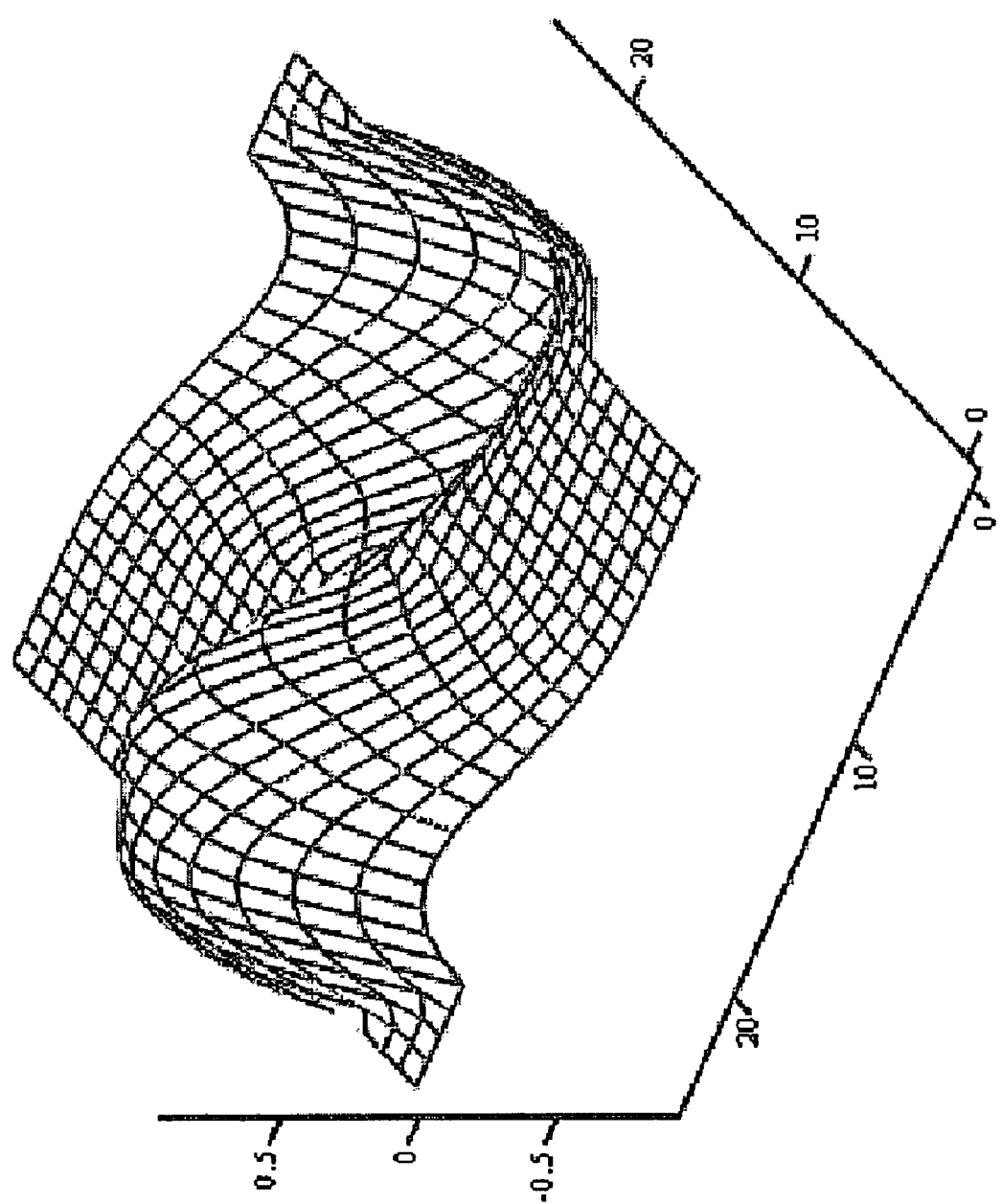
FIG. 4 is a graphical depiction of a surface of the present invention, showing both raised and indented, or burrowed, surfaces.
Figure 5:
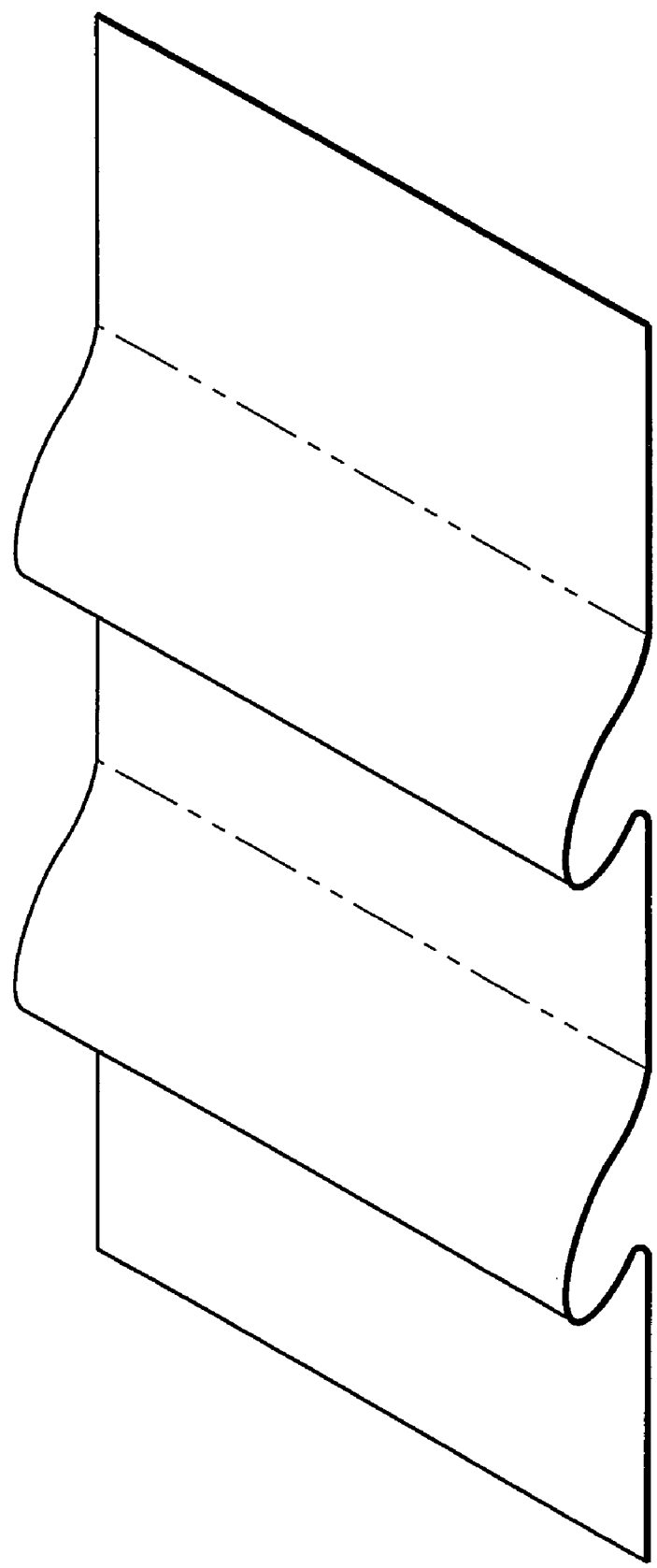
FIG. 5 is a depiction of a folded or wave surface design.
Figure 6:
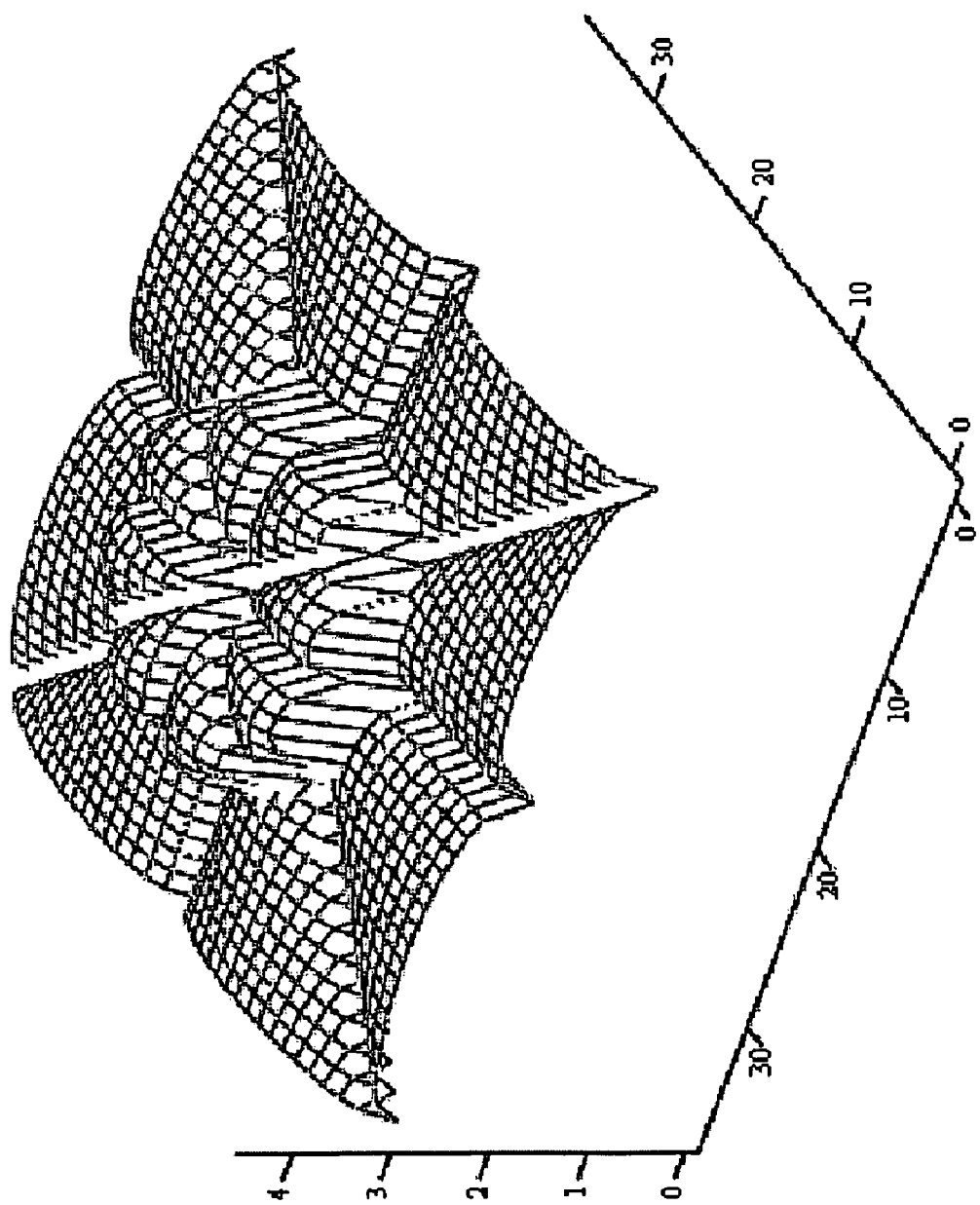
FIG. 6 is a graphical depiction of a surface pattern having alternating raised areas and depressions or crevices, varying somewhat in specific geometry (shape, height, and proximity to associated recessed areas).
Figure 7A:
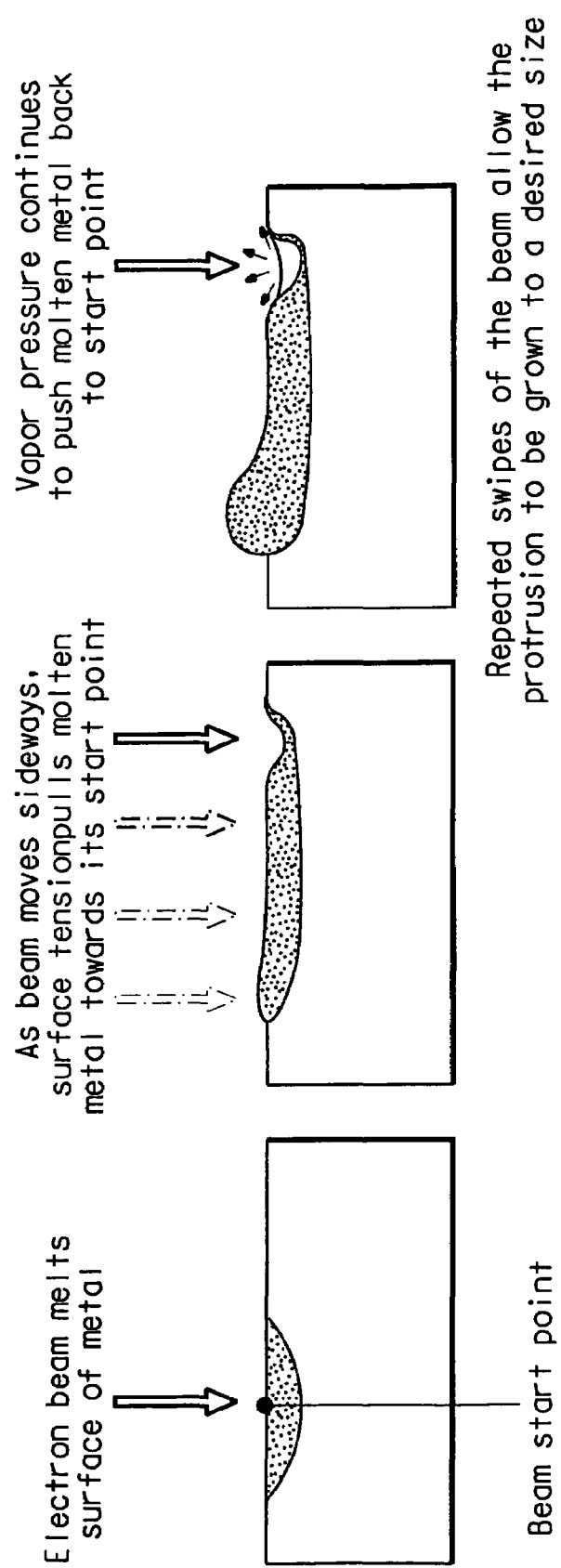
FIG. 7A shows a process for creating a protrusion design using electron beam sculpting.
Figure 7B:
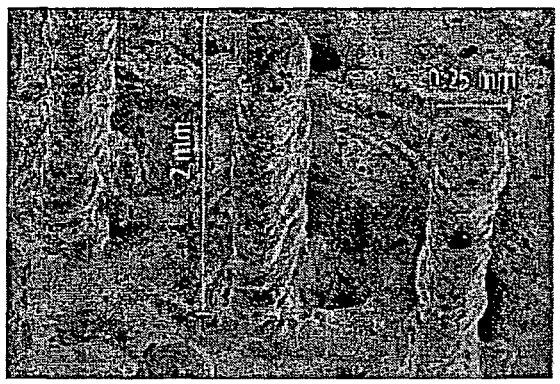
FIGS. 7B through 7E are photographs of a metal surface after it has been subjected to electron beam sculpting, which provides an example of one protrusion design possible for a polymer surface. These photographs appear on the web site http://www.newscientist.com.
Figure 7C:
Figure 7D:
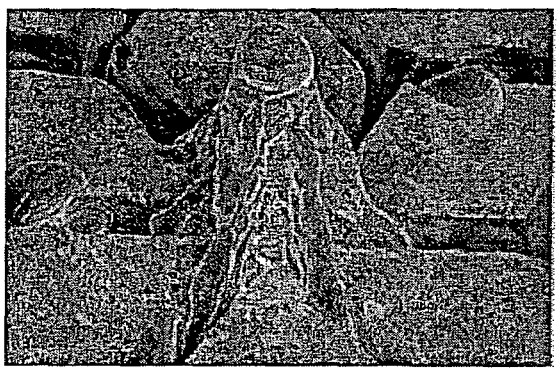
Figure 7E:
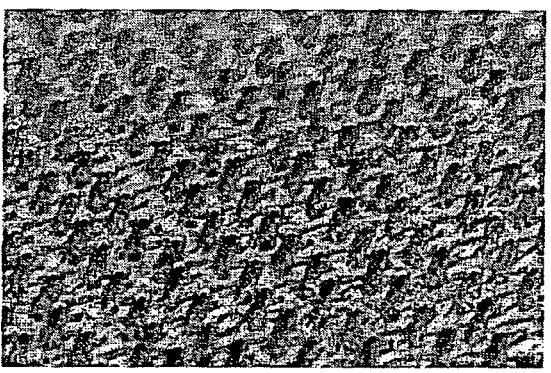

FIG. 3 is a diagram of the degree of elastic recovery which occurs after compressing the respective surface texture as a function of residual load. There exists a minimum amount of force (pressure) that is necessary to compress the surface roughness at any given temperature and time period.

Example 4

Numerous laminates were prepared (300 mm square) from sheeting from the process above via roll prepressing to check laminating performance and quality. Annealed glass (3 mm thickness) was washed with detergent (trisodium phosphate @ 3 gms./liter) and rinsed thoroughly with demineralized water and allowed to air dry. Prelaminate assemblies were created by sandwiching the respective interlayers between two pieces of said glass and taping in a couple locations to secure the relative positions of the layers to one another. The presmoothed ionomer interlayer were embossed with a variety of surface textures by placing a textured surface against the interlayer and applying pressure and slightly heating (extending from room temperature up through a complete molten state (e.g. 120 C.)). Some of these results are shown in Table 2.

To further assess the quality of the laminate with regard to the amount of residual air that was trapped within the laminate during the prepressing step and subsequent autoclave step, a bake test was conducted.

Sixteen laminates were roll prepressed at a glass surface temperature of 90 C. with a variety of haze levels resulting. Variations in appearance resulted with some samples being essentially clear while others were still hazy (related to the degree of the surface pattern still remaining). Some samples were somewhat hazy but clear around the periphery. Some slight patches of surface pattern were still noticeable in areas were the sheeting caliper was somewhat thinner. It is well established that short-term variation in sheet caliper will create trapped air pockets or create poor edge seal (if located near/at the edge of the laminate). The surface pattern within the main section of the laminate was noticeably well 'tacked' to the glass (hence, significant deairing occurred with compression of the surface pattern) but was still pronounced. This is consistent with the laminating process window studies conducted earlier. The rigidity and high softening/melting point for the ionomer sheet requires higher prepressing temperatures than for typical PVB interlayers. Also, the laminating process window for the ionomer sheet is more narrow than for PVB which places more demand on the surface pattern being effective and symmetrical from side-to-side. Sheet caliper will also have to be well controlled for laminators to achieve high yields.

As the surface pattern frequency goes higher (pattern smaller) the visual appearance of trapped contamination lessens as compared with the bold 2-mil diamond pattern. This should render any interfacial haze unobservable at least as discrete patterned areas. Interfacial haze was an ionomer sheet/glass interfacial 'contamination' that appeared in patchy areas but was significant enough to occasionally be commercially unacceptable.

It is important not to have too much residual air or other volatiles/gaseous components which can be manifested as bubbles after the lamination step is complete or occurring later as a latent bubble. A ready measure of this bubble tendency as a quality indicator can be correlated against results from a bake test. This test consists of a progressive heating of the laminates in stages and observing where and how many (& size) bubbles appear and at what temperature. All laminates exhibited edge bubbles which is not unusual and is generally ignored by the standard practices used in the laminating industry. Table 3 provides results of the laminating process temperature range over a range of interlayer material types and surface textures. Table 4 shows the importance of minimizing the amount of 'void' space (and resulting trapped air within the laminate preassembly).

TABLE 2

| Emboss Material | Oven Temp. | Vacuum Bag Time (Impression) | Impression Haze % | % Haze after Roll Prepressing at 90 C. | Laminate Quality after Autoclaving |
|---|---|---|---|---|---|
| Std. 2 mil diamond pattern | Calendar stack | | 31.9 | 7.3 | Edge blowin |
| Aluminum Screen | 50 C. | 1 hr. | 2.9 | 0.5 | Trapped Air |
| Aluminum Screen | 50 C. | 4 hrs. | 5.4 | 1.1 | Trapped Air |
| Aluminum Screen | 50 C. | overnight | 5.5 | 1.2 | Good |
| Aluminum Screen | 60 C. | 30 min. | 7.1 | 0.7 | Good |
| Aluminum Screen | 60 C. | 1 hr. | 7.4 | 1.0 | Good |
| Aluminum Screen | 60 C. | 4 hrs. | 6.8 | 0.9 | Good |
| Aluminum Screen | 60 C. | overnight | 8.3 | 1.1 | Good |
| Aluminum Screen | 70 C. | 30 min. | 9.7 | 0.7 | Good |
| Aluminum Screen | 70 C. | 4 hrs. | 26.9 | 0.6 | Good |
| Aluminum Screen | 70 C. | over weekend | 31.5 | 0.8 | Good |
| Aluminum Screen | 80 C. | 30 min. | 16.2 | 1.1 | Good |
| Aluminum Screen | 80 C. | 4 hrs. | 21.3 | 1.5 | Edge Blowin |
| Aluminum Screen | 80 C. | over weekend | 15.4 | 2.4 | Edge Blowin |
| Tetko 7-74/36 PET mesh | 90 C. | 30 min. | 54.1 | 0.6 | Good |
| Tetko 7-74/36 PET mesh | 100 C. | 30 min. | 88.9 | 0.5 | Good |

TABLE 3

Laminating Studies of Various Interlayer Types with Differing Surface Texture/Roughness Vacuum Bag Approach and Roll Pre-pressing Roll Prepress Temperature Range (C) for Optimal Quality (Low Bubble Count in Bake Test)

| Interlayer Type Laminate Assembly | Surface Pattern Roughness Measurements | | Vacuum bag (100 torr absolute pressure) | | Roll Prepress linear speed | | | |
|---|---|---|---|---|---|---|---|---|
| | Roughness $R_t$ | Area Kurtois | | | 2.0 meters/min. | | 3.5 meters/min. | |
| (2 lites of 3 mm glass) | (top/bottom) | (top/bottom) | low | high | low | high | low | high |
| DuPont PVB | — | — | 75 | 125 | 60 | 125 | 60 | 125 |
| 'Solutia' Trilayer | — | — | 60 | 125 | 60 | 125 | 60 | 125 |
| 'Solutia' Stiff | — | — | 75 | 125 | 60 | 125 | 60 | 125 |
| 'Solutia' PVB | — | — | 60 | 125 | 60 | 125 | 60 | 125 |
| EVA safe | — | — | 75 | 125 | 90 | 125 | 100 | 125 |
| Ionomer 2 mil Diamond | 61.8/22.6 | 1.92/3.39 | 90 | 125 | 100 | 110 | 100 | 110 |
| State 37 | 21.6/11.2 | 3.01/1.59 | 75 | 125 | 90 | 100 | 90 | 100 |
| State 42 | 20.0/10.1 | 3.84/1.44 | 75 | 125 | 75 | 110 | 75 | 110 |
| State 42A | 17.9/8.1 | 3.34/1.48 | 75 | 125 | 75 | 110 | 75 | 110 |
| Ionomer 'random' | 14.9/6.9 | 8.94/4.21 | 75 | 125 | 75 | 90 | 70 | 90 |

TABLE 4

| Vacuum bagged Laminate internal Pressure Level | Laminate Prepared With or without Shim Spacer placed between the two | BUBBLE COUNT AT BAKE TEST TEMPERATURE | | | | |
|---|---|---|---|---|---|---|
| Absolute (torr) | Ionomer sheets | INITIAL | 105 C. | 120 C. | 135 C. | 150 C. |
| 500 torr | Spacer (0.3 mm extra void) | 0 | 0 | 5 | 21 | 55 |
| 250 torr | Spacer (0.3 mm extra void) | 0 | 0 | 1 | 2 | 13 |
| 50 torr | Spacer (0.3 mm extra void) | 0 | 0 | 0 | 0 | 1 |
| 500 torr | Std. Layup w/smooth pattern | 0 | 0 | 0 | 0 | 1 |
| 250 torr | Std. Layup w/smooth pattern | 0 | 0 | 0 | 0 | 0 |
| 50 torr | Std. Layup w/smooth pattern | 0 | 0 | 0 | 0 | 0 |

Note:
All laminates prepared with two 1.5 mm sheets of ionomer sheet

What is claimed is:

1. A thermoplastic interlayer having an embossed surface pattern wherein the pattern provides relatively uninterrupted channels for de-airing in at least two non-parallel directions, said channels having depth of less than about 20 µm, and width about 30 µm to about 300 µm and spaced between about 0.1 mm and about 1 mm apart, and said surface pattern has roughness parameters such that the area roughness peak height (ARp) is less than 32 µm, and the ratio of the area peak height (ARp) to area roughness (ARt) is between 0.52 and 0.62, and the area kurtosis (AKu) is less than 5, wherein said interlayer is an ionoplastic polymer.

2. The thermoplastic interlayer of claim 1 wherein the width is about 40 to about 250 µm.

3. The thermoplastic interlayer of claim 1 wherein the width is about 50 to about 200 µm.

4. The thermoplastic interlayer of claim 1 wherein the surface channels are spaced between about 0.1 to about 0.9 mm apart.

5. The thermoplastic interlayer of claim 1 wherein the surface channels are spaced about 0.15 to about 0.85 mm apart.

6. The thermoplastic interlayer of claim 1 wherein the ionoplastic polymer is an ionomeric derivative of an ethylene/acid copolymer made with methacrylic acid.

7. A thermoplastic interlayer having an embossed surface pattern wherein the pattern provides relatively uninterrupted channels for de-airing in at least two non-parallel directions, said channels having depth of from about 12 to about 20 µm, and width about 30 µm to about 300 µm and spaced between about 0.1 mm and about 1 mm apart, and said surface pattern has roughness parameters such that the area roughness peak height (ARp) is less than 32 µm, and the ratio of the area peak height ($AR_p$) to total area roughness (ARt) is between 0.52 and 0.62, and the area kurtosis (AKu) is less than 5, wherein said interlayer is an ionoplastic polymer.

8. The thermoplastic interlayer of claim 7 wherein the interlayer has a surface pattern having a depth of from 14 to 20 µm.

9. The thermoplastic interlayer of claim 7 wherein the width is about 40 to about 250 µm.

10. The thermoplastic interlayer of claim 9 wherein the surface channels are spaced between about 0.1 to about 0.9 mm apart.

11. The thermoplastic interlayer of claim 10 wherein the ionoplastic polymer is an ionomeric derivative of an ethylene/acid copolymer made with methacrylic acid.

12. The thermoplastic interlayer of claim 7 wherein the width is about 50 to about 200 µm.

13. The thermoplastic interlayer of claim 12 wherein the surface channels are spaced about 0.15 to about 0.85 mm apart.

14. The thermoplastic interlayer of claim 7 wherein the surface channels are spaced between about 0.1 to about 0.9 mm apart.

15. The thermoplastic interlayer of claim 7 wherein the surface channels are spaced about 0.15 to about 0.85 mm apart.

16. A sheet of unplasticized thermoplastic ionoplastic polymer interlayer, which prior to lamination comprises at least one surface comprising an embossed surface pattern which provides relatively uninterrupted channels for de-airing in at least two non-parallel directions, said channels having depth of up to about 20 μm, and width 30 μm to 300 μm and spaced between 0.1 mm and 1 mm apart.

17. The thermoplastic interlayer of claim 16 wherein said interlayer has a surface pattern having a depth of from 12 to 20 μm.

18. The thermoplastic interlayer of claim 17 wherein the surface pattern has roughness parameters such that the area roughness peak height (ARp) is less than 32 μm, and the ratio of the of area peak height ($AR_p$) to total area roughness (ARt) is between 0.42 and 0.62, and the area kurtosis (AKu) is less than 5.

19. The thermoplastic interlayer of claim 17 which is embossed on one side of the interlayer.

20. The thermoplastic interlayer of claim 17 which is embossed on both sides of the interlayer.

21. The thermoplastic interlayer of claim 20 wherein the embossed pattern on one side of the interlayer sheet has a depth of 12 to 20 μm and the pattern is orthogonal to the edges of the sheet, while the embossed pattern on the other side of the interlayer sheet is an identical embossed pattern but is slanted at some angle that is greater than or less than 9° to the edges.

22. The thermoplastic interlayer of claim 20 wherein the embossing pattern and/or the depth thereof of the two sides are asymmetric with respect to each other.

23. The thermoplastic interlayer of claim 17 said channels having depth of from 12 to less than 20 μm.

24. The thermoplastic interlayer of claim 16 wherein said Interlayer has a surface pattern having a depth of from about 14 to about 20 μm.

25. The thermoplastic interlayer of claim 16 wherein the ionoplastic polymer is an ionomeric derivative of an ethylene/acid copolymer made with methacrylic acid.

\* \* \* \* \*

UNITED STATES PATENT AND TRADEMARK OFFICE
CERTIFICATE OF CORRECTION

| | |
|---|---|
| PATENT NO. | : 7,351,468 B2 |
| APPLICATION NO. | : 11/292721 |
| DATED | : April 1, 2008 |
| INVENTOR(S) | : Charles Anthony Smith and Jerrel Charles Anderson |

It is certified that error appears in the above-identified patent and that said Letters Patent is hereby corrected as shown below:

Claim 1, Column 11, Line 49 - add --total-- after "to" so the line should read: peak height (ARp) to total area roughness (ARt) is between 0.52

Claim 21, Column 14, Line 7 - delete "9°" and add --90°-- so the line should read: 90° to the edges.

Signed and Sealed this

Twelfth Day of August, 2008

JON W. DUDAS
*Director of the United States Patent and Trademark Office*